(12) United States Patent
Lafage et al.

(10) Patent No.: US 7,110,029 B2
(45) Date of Patent: Sep. 19, 2006

(54) PROCESSING OF A DATA SET

(75) Inventors: Anne Lafage, Aix-En-Provence (FR); Jean Gobert, Maisons Alfort (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 609 days.

(21) Appl. No.: 09/939,271

(22) Filed: Aug. 24, 2001

(65) Prior Publication Data

US 2002/0024526 A1 Feb. 28, 2002

(30) Foreign Application Priority Data

Jul. 31, 2000 (FR) .................................. 00 10047

(51) Int. Cl.
*H04N 3/14* (2006.01)
*H04N 5/335* (2006.01)

(52) U.S. Cl. ...................................... 348/300; 382/232
(58) Field of Classification Search ................ 348/300; 382/132
See application file for complete search history.

(56) References Cited

U.S. PATENT DOCUMENTS 6,195,368 B1 * 2/2001 Gratacap .................... 370/535

* cited by examiner

*Primary Examiner*—Andrew W. Johns
*Assistant Examiner*—Patrick Edwards

(74) *Attorney, Agent, or Firm*—Larry Liberchuk

(57) ABSTRACT

A data processing arrangement comprises an input circuit [INP], an interconnection network [ICN] and a data processing circuit [PRC]. The input circuit [INP] forms successive groups of data [GRP] and, moreover, generates a basic control data item [BCD] and an additional control data item [SCD] for each group of data [GRP]. A basic control data item [BCD] indicates for each data item one of a plurality of terminals [1–4] to which the data item should be applied. An additional control data item [SCD] indicates for each data item if this data item is valid [+] or not valid [–]. The interconnection network [ICN] applies the successive groups of data to the terminals [1–4] in dependence on the basic control data item [BCD] and on the additional control data item [SCD]. The interconnection network [ICN] applies a data item to the terminal indicated by the basic control data item [BCD] if the data item is valid [+]. If the data item is not valid [–], the interconnection network [ICN] applies another valid data item instead. The data processing circuit [PRC] processes the data applied to the terminals [1–4] in order to obtain an output data item.

Such a data processing arrangement enables a low-cost processing of a set of data, some of which may be non-valid. The arrangement can be employed, for example, for filtering a set of pixels obtained from a MPEG4 decoder.

6 Claims, 3 Drawing Sheets

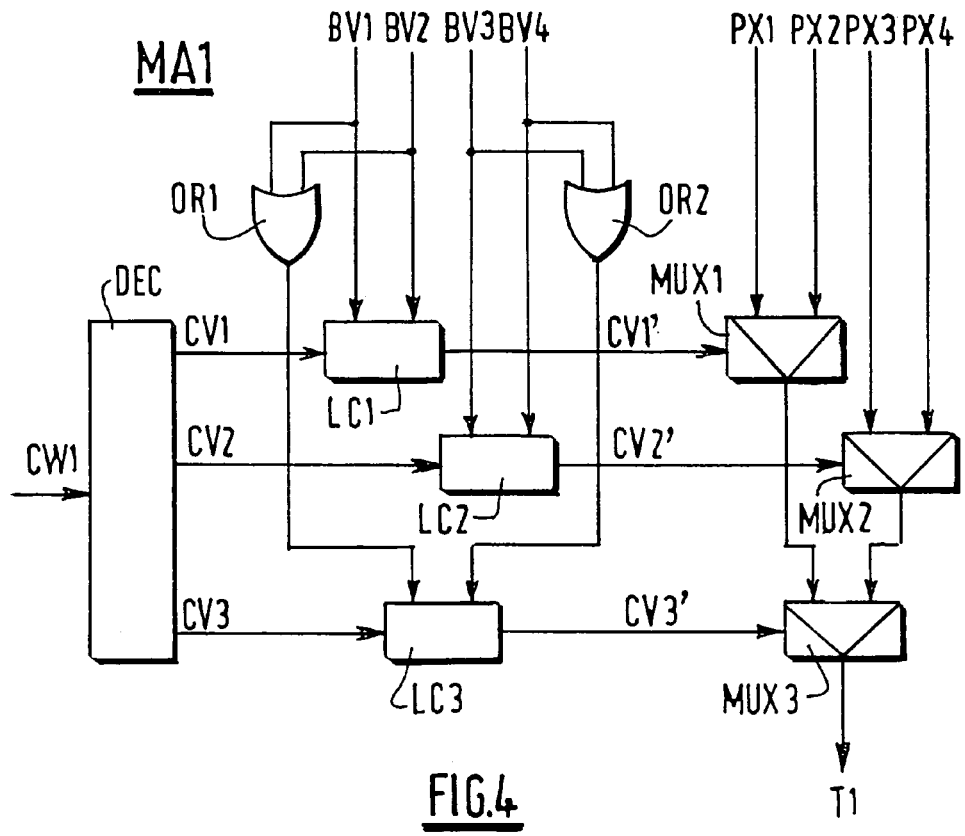

PROCESSING OF A DATA SET

The invention relates to the processing of a data set. The invention can be used, for example, for filtering a set of pixels obtained by decoding in accordance with the MPEG4 standard. (MPEG is the acronym for Motion Picture Experts Group.)

Processing of a data set can be effected by means of a processing circuit which supplies an output data item in response to a group of data. The processing circuit receives each data item of the group via a different terminal. An FIR filter is an example of such a processing circuit. (FIR is the acronym for Finite Impulse Response.) Each terminal has an associated filter coefficient. The filter multiplies a data item applied to a certain terminal by the filter coefficient associated with this terminal. This results in a weighted data item. The filter adds the weighted data thus obtained in order to obtain an output data item. The output data item will be correct only if each data item of a group is applied to a specific terminal.

An implementation as described hereinbefore will have an input circuit for the formation of successive groups of data in order to apply these to the processing circuit. The input circuit can be arranged in such a manner that there is not a fixed relationship between the position of a data item in a group and the terminal to which this data item is to be applied. For example, the input circuit can form a group of data comprising four data items: A, B, C and D in accordance with their respective positions. The data A, B, C and D should be applied to the terminals numbered 1, 2, 3 and 4, respectively. Subsequently, the input circuit can form a following group comprising the data E, B, C, D in accordance with their respective positions. (A is replaced with E.) The data E, B, C and D should be applied to the terminals numbered 4, 1, 2 and 3, respectively.

The successive groups of data can be applied to the processing circuit by means of an interconnection network. As a matter of fact, the interconnection network enables the respective positions of the data of a group to be changed. The interconnection network consequently enables each data item to be applied to the appropriate terminal.

It is an object of the invention to enable low-cost processing of a set of data of which some data may be non-valid.

In accordance with the invention such a processing is characterized as follows. An input circuit forms successive groups of data and, moreover, generates basic control data and additional control data for each group of data. A basic control data item indicates for each data item one of a plurality of terminals to which the data item should be applied. An additional control data item indicates for each data item if this input data item is valid or not valid. An interconnection network applies the successive groups of data to the terminals in dependence on the basic control data and the additional control data. The interconnection network is arranged to apply a data item to the terminal indicated by the basic control data if the data item is valid. If the data item is not valid the interconnection network applies, instead of it, a valid other data item. A data processing circuit processes the data applied to the terminals in order to obtain an output data item.

The invention takes the following aspects into consideration. A set of data may include non-valid data. For example, a set of pixels resulting from MPEG4 decoding typically represents a visual object. Certain pixels belong to the object while other pixels do not belong to the object. The last-mentioned pixels are not valid.

If a set of data contains non-valid data there is a risk of distortion. Distortion will occur when a group of data contains one or more non-valid data items while the resulting output data item is considered to be valid. Let us consider, for example, asymmetrical FIR filtering. In general, the output of the FIR filter will be regarded as valid if the data applied to the central terminal of the FIR filter is valid. Let it be assumed now that another data item of the group is not valid. In this case, the output data item will be determined partly by this non-valid data item, which means a distortion of the result of the FIR filtering.

The risk of distortion can be precluded by means of a pre-processing of the set of data. The pre-processing assigns a substitute or padding value to each non-valid data item. This padding value will generally be determined on the basis of one or more valid data items. The padding value may be, for example, be the mean of the values of all the valid data items. This padding value will thus be generic and adapted to be assigned to each non-valid data item. Another option is to calculate a padding value for each individual non-valid data item.

However, a pre-processing as described hereinbefore will be comparatively complex and, consequently, slow and costly. For example, the calculation of a generic padding value requires that all the valid data are taken into account. If a padding value is calculated for each individual non-valid data item this also means that numerous operations have to be performed.

In accordance with the invention, a non-valid data item actually replaced by a valid data item by means of an interconnection network. This substitution is then effected during the application of a group of data to the processing circuit. Thus, there is no need to carry out a pre-processing in order to assign a padding value to each non-valid data item. The invention consequently enables a cheaper and faster data processing to be achieved.

These as well as other aspects of the invention will be described in more detail with reference to the following Figures.

FIG. 3 is a diagram which illustrates a method in accordance with which a set of input pixels and a set of Boolean values are stored in the MPEG4 video filtering arrangement; and FIG. 4 is a diagram which shows a multiplexing device which forms part of the MPEG4 video filtering arrangement.

The following remarks relate to the reference signs. Similar entities bear identical reference letters in all the Figures. A plurality of similar entities may appear in a single Figure. In that case a numeral is suffixed to the reference letters in order to distinguish between similar entities. The numeral or suffix may be omitted where appropriate. This applies both to the description and to the Claims.

Figure 1:
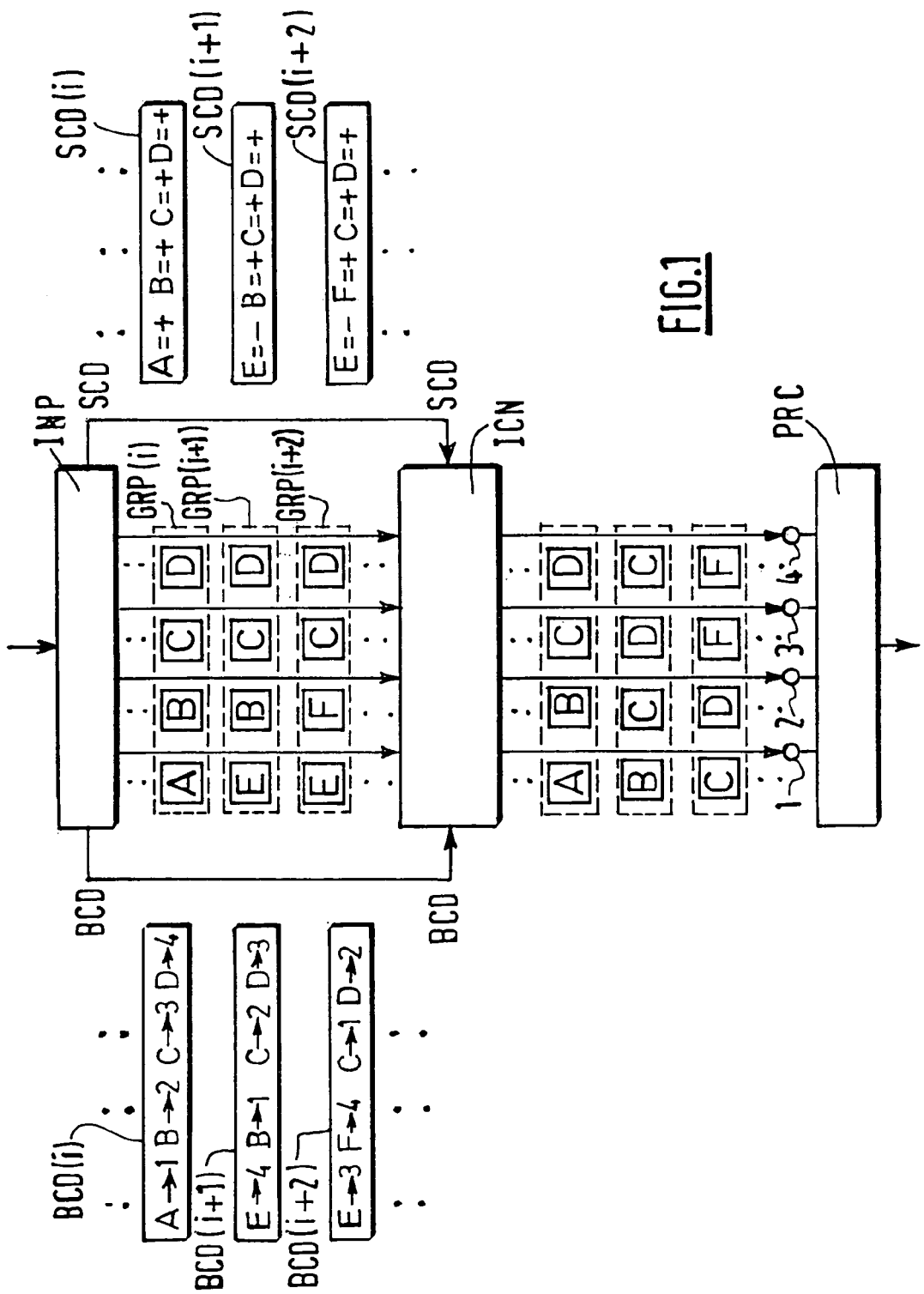
FIG. 1 is a conceptual diagram which illustrates the basic characteristic features described hereinbefore.

FIG. 1 illustrates the basic features described hereinbefore. A data processing arrangement comprises an input circuit [INP], an interconnection network [ICN] and a data processing circuit [PRC]. The input circuit [INP] forms successive groups of data [GRP] and, moreover, generates basic control data [BCD] and additional control data [SCD] for each group of data [GRP]. A basic control data item [BCD] indicates for each data item one of a plurality of terminals [1–4] to which the data item should be applied. An additional control data item [SCD] indicates for each data item if this data item is valid [+] or not valid [−]. The interconnection network [ICN] applies the successive groups of data to the terminals [1–4] in dependence on the basic control data [BCD] and the additional control data [SCD]. The interconnection network [ICN] applies a data item to the terminal indicated by the basic control data [BCD] if the data is valid [+]. If the data item is not valid [–] the interconnection network [ICN] applies a valid data item instead. The data processing circuit [PRC] processes the data applied to the terminals [1–4] in order to obtain an output data item.

The features illustrated in FIG. 1 can be used, for example, for processing a set of pixels obtained by decoding in accordance with the MPEG4 standard. Such a set of pixels typically represents an object such as, for example, a person, a ball or a house. It is accompanied by a set of Boolean values. There is a Boolean value for each pixel. The Boolean value indicates whether or not the relevant pixel belongs to the object. Thus, the set of Boolean values forms a shape description.

Figure 2:
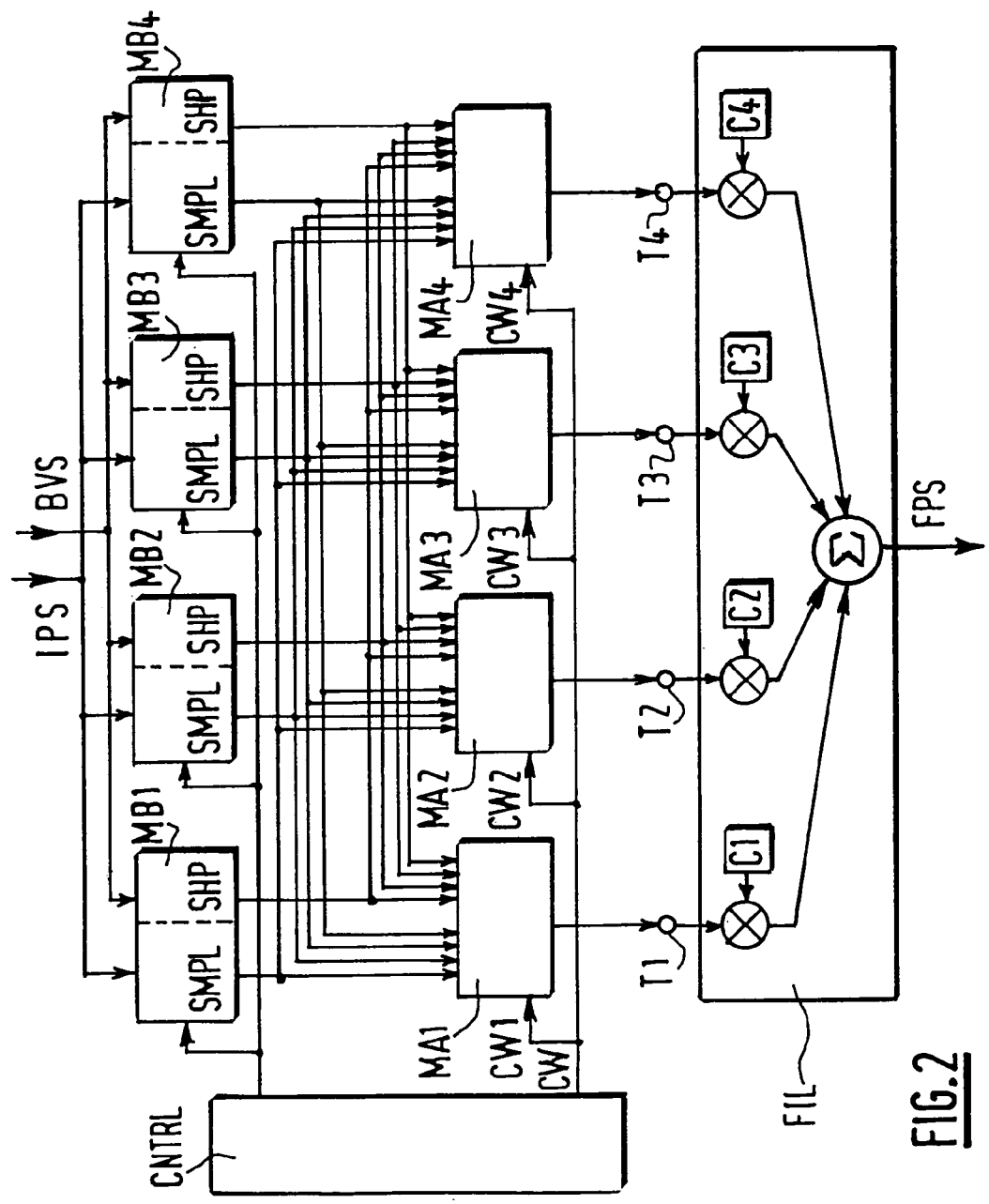
FIG. 2 is a diagram which shows an MPEG4 video filtering arrangement.

FIG. 2 shows an MPEG4 video filtering arrangement. MPEG4 video filtering arrangement receives a set of input pixels [IPS] and an associated set of Boolean values [BVS]. In response thereto, it supplies a set of filtered pixels [FPS]. The MPEG4 video filtering arrangement comprises 4 memory banks [MB], numbered from one to four [MB1–MB4]. Each memory bank [MB] comprises a section [SMPL] for the storage of pixels and another section [SHP] for the storage of the Boolean values. The MPEG4 video filtering arrangement further comprises a control circuit [CNTRL], four multiplexing devices [MA], numbered from one to four [MA1–MA4], and a filter [FIL] having four taps [T], numbered from one to four [T1–T4]. Each tap [T] has an associated filter coefficient [C].

The MPEG4 video filtering arrangement operates as follows. The MPEG4 video filtering arrangement receives the set of input pixels [IPS] in the form of a stream. In parallel it receives the set of Boolean values [BVS], also in the form of a stream. The two streams are synchronized. For each pixel and Boolean value received the control circuit [CNTRL] selects a certain memory bank [MB] in which the pixel and the Boolean value are stored. Thus, the set of input pixels [IPS] and the set of Boolean values [BVS] are stored in the four memory banks [MB] in accordance with a certain method.

FIG. 3 illustrates the method in accordance with which the set of input pixels and the set of Boolean values are stored in the memory banks. FIG. 3 shows a part of a matrix. This matrix represents both the set of input pixels and the set of Boolean values. Each cell of the matrix represents a pixel and its associated Boolean value. The number shown in a cell is the number of the memory bank which stores the pixel and the Boolean value. For example, the top-left pixel [1] of the set of input pixels is stored in the first memory bank. Its right-hand neighbor [2], its neighbor below it [3] and its diagonal neighbor [4] are stored in the second, the third and the fourth memory bank, respectively.

FIG. 3 also shows a window [W]. The window [W] measures 2 by 2 cells. The window [W] defines four pixels and four Boolean values stored in the memory banks. These pixels and Boolean values are read from the memory bank in a first read operation. The window [W] moves one unit to the right for a second read-out of the memory bank. The window [W] keeps moving one unit to the right until it reaches the right-hand side of the matrix. Subsequently, the window [W] returns to the left-hand side of the matrix after having moved one unit downward. The window [W] thus scans the matrix horizontally. Each different position of the window [W] corresponds to a read-out of four pixels and four Boolean values.

It is to be noted that the method illustrated in FIG. 3 has the following characteristic feature. For any position occupied of the window [W] each pixel and each Boolean value defined by the window [W] is stored in a different memory bank. As a result of this, only one read-out per memory bank is required in order to obtain all the pixels defined by the window. These read operations can be performed in parallel. Thus, in principle, one clock cycle suffices to read all the pixels defined by the window. As a result, the method illustrated in FIG. 3 enables a fast read-out and, consequently, a fast filtering to be achieved.

Each read-out performed by moving the window [W] in FIG. 3 results in a group of pixels that produces an output pixel. The output pixel is obtained by means of the filter [FIL] shown in FIG. 2. There is a fixed relationship between the position of a pixel in the window [W] and the tap [T] to which the pixel is to be applied. The top-left pixel of the window should be applied to the first tap [T1]. The top-right pixel of the window should be applied to the second tap [T2]. The bottom-left pixel of the window should be applied to the third tap [T3]. The bottom-right pixel of the window should be applied to the fourth tap [T4].

The control circuit [CNTRL] shown in FIG. 2 carries out the read operations described hereinbefore. Each read operation thus produces a group of four pixels. The control circuit [CNTRL] supplies a set of control words [CW] with each pixel read operation. For each pixel of the group the set of control words [CW] indicates the tap [TP] to which the pixel is to be applied.

In more detail, the control circuit [CNTRL] generates four control words, numbered from one to four [CW1–CW4], for the first to the fourth multiplexing device [MA1–MA4]. The first control word [CW1] indicates the memory bank [MB] from which the pixel to be applied to the first tap [T1] originates. Likewise, the second, the third and the fourth control words [CW2, CW3, CW4] indicate the memory banks [MB] from which the pixels to be applied to, respectively, the second tap, the third tap and the fourth tap [T1, T3, T4] originate. Each control word [CW] may comprise, for example, a two-bit binary value. This value indicates the memory bank [MB] from which the pixel to be applied to the relevant tap [T] originates.

The control circuit [CNTRL] can be realized, for example, by means of programmable counters. A programmable counter can be used to select a memory bank [MB] during loading of the set of input pixels [IPS]. Four programmable counters can be used to generate addresses during the loading operation, i.e. one programmable counter for each memory bank [MB]. The programmable counter for the selection of a memory bank [MB] activates that programmable counter of these four programmable counters which corresponds to the selected memory bank [MB]. Four other programmable counters can be used to perform the read operation in order to form successive groups of pixels. For each read operation these four programmable counters will generate four addresses in parallel, i.e. one address for each memory bank [MB]. Other programmable counters can be used to generate control words [CW]. The control word [CW] are cyclic, which is apparent from FIG. 3 and the description with reference thereto.

The successive groups of pixels are applied to the filter [FIL] by means of multiplexing devices [MA] shown in FIG. 2. There is a multiplexing device [MA] for each tap [T] of the filter [FIL]. Each multiplexing device [MA] receives the group of pixels produced as a result of the current read operation and the associated group of binary values. It further receives the associated control word [CW]. The multiplexing device [MA] selects a pixel in order to apply this pixel to the tap [T] of the filter [FIL] to which the multiplexing device [MA] belongs. The multiplexing device [MA] selects the pixel indicated by the control word [CW] provided that this pixel is valid. This last-mentioned information is contained in the binary value associated with the pixel. If the pixel is not valid the multiplexing device selects a valid other pixel. If the group does not include any valid picture the multiplexing device [MA] selects a pixel in a random manner. In the last-mentioned case the resulting output pixel from the group of pixels will not be valid and, as a consequence, its value does not matter.

The filter [FIL] multiplies the pixels applied to the taps [T] by the respective filter coefficients [C] associated with them. The multiplication of the pixel applied to the first tap [T1] by the filter coefficient [C1] results in a first weighted pixel. The multiplication of the pixel applied to the second tap [T2] by the filter coefficient [C2] results in a second weighted pixel, etc. The four weighted pixels thus obtained are added in order to obtain an output pixel.

FIG. 4 shows the first multiplexing device [MA1]. The other multiplexing devices [MA2, MA3, MA4] shown in FIG. 2 are identical. As described hereinbefore, the first multiplexing device [MA1] receives a group of four pixels [PX], a group of four associated binary values [BV] and the first control word [CW1] from the control circuit [CNTRL]. In response thereto, the first multiplexing device [MA1] selects a pixel in order to apply it to the first tap [T1] of the filter [FIL] shown in FIG. 3. The pixels [PX] are numbered from one to four [PX1–PX4]. The binary values [BV] are also numbered from one to four [BV1–BV4]. The numbers indicate the respective memory banks [MB1–MB4] from which the pixels and their binary values are retrieved.

The first multiplexing device [MA1] comprises a decoding circuit [DEC], a first and a second OR circuit [OR1, OR2], three logic circuits [LC], numbered from one to three [LC1–LC3] and three multiplexers [MUX], number from one to three [MUX1–MUX3]. The first, the second and the third logic circuit [LC1–LC3] are associated with the first, the second and the third multiplexer [MUX1–MUX3], respectively. The three multiplexers [MUX] are of the type having two inputs and one output. A multiplexer selects an input in order to transfer the data on this input to another circuit.

The first multiplexing device [MA1] operates as follows. The decoding circuit [DEC] decodes the first control word [CW1] in order to obtain three basic control values [CV], numbered from one to three [CV1–CV3]. The first, the second and the third basic control value [CV1–CV3] are associated with the first, the second and the third multiplexer [MUX1–MUX3], respectively. Each basic control value [CV] indicates the input to be selected by the relevant multiplexer [MUX].

Since each multiplexer [MUX] selects only one of two inputs each basic control value [CV] can be coded by means of a single bit. For example, if the basic control value [CV] is zero (0), this indicates that the relevant multiplexer [MUX] should select the left-hand input. Conversely, if the basic control value [CV] is one (1), it indicates that the multiplexer [MUX] should select the right-hand input. Let it be assumed that the control word [CW] indicates the second pixel [PX2]. In this case, the first basic control value [CV1] will be one (1) and the third basic control value [CV3] will be zero (0). Now the second basic control value [CV2] will not play any part and can consequently be zero (0) or one (1).

The logic circuits [LC] are arranged between the decoding circuit [DEC] and the multiplexers [MUX] in order to enable the basic control values [CV] to be changed. Each logic circuit [LC] receives two values in dependence on which the basic control value [CV] is changed or not. These two values are formed on the basis of the binary values [BV] associated with the relevant pixels [PX]. Each logic circuit [LC] thus supplies a final control value [CV'] equal to the basic control value [CV] or opposed thereto, depending on the binary values [BV]. The final control value [CV'] determines the selection made by the multiplexer [MUX] to which it is applied.

In more detail, the first logic circuit [LC1] changes or does not change the basic control value $[CV_1]$ depending on the first and the second binary value [BV1, BV2]. Let it be assumed that the first basic control value [CV1] is zero (0). The first basic control value [CV1] thus indicates that the first multiplexer [MUX1] should select the first pixel [PIX1]. Let it further be assumed that the first binary value [BV1] associated with the first pixel [PX1] is one (1). This means that this pixel is valid. In this case, the first logic circuit [LC1] does not change the first basic control value [CV1]. The final first control value $[CV'_1]$ is consequently zero (0) and, as a result, the first multiplexer [MUX1] actually selects the first pixel [PX1]. Let it now be assumed that the first binary value [BV1] is zero (0) and that the second binary value [BV2] is one (1). This means that the first pixel [PX1] is not valid, whereas the second pixel [PX2] is valid. In this case, the first logic circuit [LC1] alters the first basic control value [CV1]. The first final control value [CV1'] is therefore one (1) and, consequently, the first multiplexer [MUX1] selects the second pixel [PX2] instead of the first pixel [PX1].

The first logic circuit [LC1] operates in a manner comparable to that in the case that the first basic control value [CV1] is one (1). In this case, it actually verifies if the second pixel [PX2] is valid. If the second pixel [PX2] is not valid, the first logic circuit [LC1] will change the first basic control value [CV1] so as to achieve that the first multiplexer [MUX1] selects the first pixel [PX1] provided that this is valid.

The second logic circuit [LC2] operates in the same way as the first logic circuit [LC1] described hereinbefore. The second basic control value [CV2] takes the place of the first basic control value [CV1]. The third and the fourth binary value [BV3, BV4] take the place of the first and the second binary value [BV1, BV2], respectively. The second multiplexer [MUX2] takes the place of the first multiplexer [MUX1]. The third and the fourth pixel [PX3, PX4] take the place of the first and the second pixel [PX1, PX2], respectively.

The third logic circuit [LC3] receives two OR combinations of the binary values [BV]. The first and the second OR circuit [OR1, OR2] supply a first OR combination and a second OR combination, respectively. The first OR combination is the result of an OR operation performed upon the first and the second binary values [BV1, BV2]. It indicates if the pixel selected by the first multiplexer [MUX1] is valid or not valid. The second OR combination is the result of an OR operation performed upon the third and the fourth binary value [BV3, BV4]. It indicates if the pixel selected by the second multiplexer [MUX2] is valid or not valid.

The third logic circuit [LC3] operates in the same way as the first logic circuit [LC1] described hereinbefore. The third basic control value [CV3] takes the place of the first basic control value [CV1]. The first and the second OR combination take the place of the first and the second binary value [BV1, BV2], respectively. The third multiplexer [MUX3] takes the place of the first multiplexer [MUX1]. The pixels selected by the first and the second multiplexers [MUX1, MUX2] take the place of the first and the second pixel [PX1, PX2].

The MPEG4 video filtering arrangement described hereinbefore with reference to FIGS. 2–4 is an example of the implementation of the characteristic features illustrated in FIG. 1. The input circuit [INP] shown in FIG. 1 takes the form of four memory banks [MB1–MB4] and the control circuit [CNTRL] shown in FIG. 2. The basic control data [BCD] shown in FIG. 1 take the form of four control word [CW1–CW4] shown in FIG. 2. The additional control data [SCD] take the form of four binary values [BV1–BV4] shown in FIG. 4, the binary values being obtained from the memory banks [MB] shown in FIG. 2. The interconnection network [ICN] shown in FIG. 1 takes the form four multiplexing devices [MA1–MA4] shown in FIG. 2. The data processing circuit [PRC] shown in FIG. 1 takes the form of the filter [F] shown in FIG. 2.

The above description with reference to various Figures illustrates rather than limits the invention. It is evident that there are numerous alternatives within the scope of the appended Claims. In conclusion, some remarks are made in this respect.

There are numerous methods of forming successive groups of data. The MPEG4 video filtering arrangement shown in FIG. 2 forms groups of four data items. Other implementations of the invention may form, for example, groups of two, three, five or six data items, etc. The number of items in a group is not relevant.

There are numerous methods of processing a group of data. The MPEG4 video filtering arrangement shown in FIG. 2 forms a weighted combination of a group of data. Other implementations of the invention may perform other types of processing, for example a discrete cosine transform.

There are numerous methods of rearranging a group of data. The MPEG4 video filtering arrangement shown in FIG. 2 comprises four multiplexing devices [MA1–MA4], each including three multiplexers [MUX1–MUX3] of the type having two inputs and one output, as shown in FIG. 4. Other implementations of the invention may include multiplexers of other types. It is possible, for example, to replace the four multiplexing devices [MA1–MA4] shown in FIG. 2 with a single multiplexer of the type having sixteen inputs and four outputs and an appropriate logic circuit. It is likewise possible to replace the three multiplexers of the type having two inputs and one output, as shown in FIG. 4, with a single multiplexer of the type having four inputs and one output. In this respect, it is to be noted that the multiplexing device shown in FIG. 4 comprises, in fact, two multiplexing layers: a first layer including the first and the second multiplexer [MUX1, MUX2] and a second layer including the third multiplexer [MUX3]. Replacing the three multiplexers of the type having two inputs and one output, as shown in FIG. 4, with a single multiplexer of the type having four inputs and one output means, in fact, that a multiplexing device is formed having a single layer instead of two layers. Let it now be assumed that the groups of data comprise 8 data items instead of 4 data items as shown in FIG. 4. In this case, it is possible, for example to realize a multiplexing device having a single layer by means of a multiplexer of the type having eight inputs and one output, or having two layers by means of multiplexers of the type having four inputs and one output, or having three layers by means of multiplexers of the type having two inputs and one output.

There are numerous ways of implementing functions by means of items of hardware or software or a combination of the two. In this respect, it is to be noted that the Figures are highly diagrammatic, each Figure representing merely a single embodiment of the invention. Thus, although a Figure shows different functions as separate blocks, this does not exclude the possibility that a single item of hardware or software performs a plurality of functions. This by no means excludes the possibility that a function may be carried out by a set of hardware or software items.

For example, the MPEG4 video filtering arrangement shown in FIG. 2 comprises different blocks which, in combination, form groups of data and processes these. In principle, it is possible to realize these blocks by means of a suitably programmed computer circuit. A set of instructions contained in a program memory can cause the computer circuit to carry out the different operations described hereinbefore with reference to FIGS. 2–4. The set of instructions can be loaded into the program memory by reading a data carrier, for example a disc which carries the set of instructions. Reading may be effected via a communication network such as, for example, the internet. In this case, a service provider will make the set of instructions available to those interested.

Any reference signs given in parentheses in a claim shall not be construed as limiting said claim. The use of the verb "to comprise" does not exclude the presence of any other elements or steps other than those defined in a claim. The use of the indefinite article "a" or "an" preceding an element or step does not exclude the presence of a plurality of these elements or steps.

The invention claimed is:

1. A data processing arrangement comprising:
    an input circuit for forming data items into successive groups of data and for generating a basic control data item and an additional control data item for each group of the successive groups of data the additional control data item indicating for each data item if this data item is valid or not valid;
    a data processing circuit, containing a plurality of terminals, for processing the data applied to the terminals in order to obtain an output data item; and
    an interconnection network comprising a plurality of logic circuits, each of which corresponds to one of said plurality of terminals, for supplying a plurality of final control values based on the basic control data item and the additional control data item, wherein the interconnection network applies selected ones of the data items in a selected one of the successive groups of data from said input circuit to corresponding ones of said plurality of terminals of said processing circuit if the corresponding final control value indicates the data item is valid and, wherein one of the plurality of logic circuit replaces a basic control value of the corresponding basic control data item if the corresponding final control value indicates the data item is not valid.

2. The arrangement as recited in claim 1, wherein said basic control data item indicates for each data item one of said plurality of terminals to which the data item is applied.

3. A method of processing data, comprising the steps of:
    forming data items into successive groups of data and generating a basic control data item and an additional control data item for each group of the successive groups data, said additional control data item indicating for each data item if this data item is valid or not valid;

supplying a plurality of final control values based on the basic control data item and the additional control data item;

applying the data items in a selected one of the successive groups of data to terminals of a processor if the corresponding final control value indicates the data item is valid; and replacing a basic control value of the corresponding basic control item if the corresponding final control value indicates the data item is not valid to apply a valid data item selected from among the data items within the selected group of data instead, wherein the data items applied are processed in order to obtain an output data item.

4. The method as recited in claim 3, wherein said basic control data item indicates for each data item one of said terminals to which the data item is applied.

5. A computer program product, stored on a computer readable medium for a data processing arrangement, the "computer program" product comprising a set of instructions which, when loaded into a data processing arrangement, causes this arrangement to carry out the following steps:

a forming step in which data items are formed into successive groups of data and a basic control data item and an additional control data item are generated for each of the successive groups of data, said additional control data item indicating for each data item if this data item is valid or not valid;

a supplying step for supplying a plurality of final control values based on the basic control data item and the additional control data item;

an application step in which data items of a selected one of the successive groups of data are applied to terminals of a processor if the corresponding final control value indicates the data item is valid;

a replacement step for replacing a basic control value of the corresponding basic control data item if the corresponding final control value indicates the data item is not valid to apply a valid data item selected from among the data items within the selected group of data instead; and a processing step performed in said processor in which the data items applied are processed in order to obtain an output data item.

6. The product as recited in claim 5, wherein said basic control data item indicates for each data item one of said terminals to which the data item is applied.

* * * * *